(12) United States Patent
Indersie et al.

(10) Patent No.: US 9,759,163 B2
(45) Date of Patent: Sep. 12, 2017

(54) COMBUSTION CHAMBER PROVIDED WITH A TUBULAR ELEMENT

(75) Inventors: Dominique Indersie, Vernon (FR); Didier Guichard, Menilles (FR)

(73) Assignee: SNECMA, Paris (FR)

(*) Notice: Subject to any disclaimer, the term of this patent is extended or adjusted under 35 U.S.C. 154(b) by 799 days.

(21) Appl. No.: 13/812,261

(22) PCT Filed: Jul. 26, 2011

(86) PCT No.: PCT/FR2011/051792
§ 371 (c)(1),
(2), (4) Date: Apr. 9, 2013

(87) PCT Pub. No.: WO2012/022889
PCT Pub. Date: Feb. 23, 2012

(65) Prior Publication Data
US 2013/0219901 A1    Aug. 29, 2013

(30) Foreign Application Priority Data

Jul. 26, 2010 (FR) ..................... 10 56104

(51) Int. Cl.
*F02K 9/97* (2006.01)
*F02K 9/62* (2006.01)
(Continued)

(52) U.S. Cl.
CPC .............. *F02K 9/97* (2013.01); *F02K 9/32* (2013.01); *F02K 9/34* (2013.01); *F02K 9/343* (2013.01);
(Continued)

(58) Field of Classification Search
CPC ... F02K 9/32; F02K 9/34; F02K 9/343; F02K 9/40; F02K 9/42; F02K 9/60; F02K 9/62;
(Continued)

(56) References Cited

U.S. PATENT DOCUMENTS 2,686,400 A * 8/1954 Andrus ............... F02K 9/64
 60/258
2,705,399 A * 4/1955 Allen ................. F02K 9/64
 239/127.3

(Continued)

FOREIGN PATENT DOCUMENTS

| EP | 1 422 018 | 5/2004 |
|---|---|---|
| FR | 2 733 581 | 10/1996 |
| GB | 793 300 | 4/1958 |

OTHER PUBLICATIONS

International Search Report Issued Jan. 12, 2012 in PCT/FR11/51792 Filed Jul. 26, 2011.

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A combustion chamber including a diverging portion. The combustion chamber extends along a longitudinal axis and includes a fluid injection system from which there extends in a downstream direction a wall presenting a throat and a diverging portion situated downstream from the throat. The chamber further includes a tubular element surrounding the wall at least in part and configured to take up most of forces generated during operation of the chamber on the downstream end of the wall to transfer the forces to a structure situated upstream from the chamber.

12 Claims, 1 Drawing Sheet

(51) Int. Cl.
*F02K 9/60* (2006.01)
*F02K 9/42* (2006.01)
*F02K 9/34* (2006.01)
*F02K 9/32* (2006.01)
*F02K 9/40* (2006.01)
*F02K 9/64* (2006.01)

(52) U.S. Cl.
CPC ............... *F02K 9/40* (2013.01); *F02K 9/42* (2013.01); *F02K 9/60* (2013.01); *F02K 9/62* (2013.01); *F02K 9/64* (2013.01); *F02K 9/972* (2013.01); *F02K 9/974* (2013.01); *F05D 2230/50* (2013.01); *F05D 2300/603* (2013.01)

(58) Field of Classification Search
CPC ... F02K 9/64; F02K 9/97; F02K 9/972; F02K 9/974
See application file for complete search history.

(56) References Cited

U.S. PATENT DOCUMENTS

| | | | | |
|---|---|---|---|---|
| 2,714,286 A * | 8/1955 | Zucrow | ...................... | F02K 9/62 60/258 |
| 2,958,183 A * | 11/1960 | Singelmann | ............... | F02K 9/64 138/111 |
| 3,863,443 A * | 2/1975 | Chamberlain | ............ | F02K 9/64 60/260 |
| 4,779,799 A * | 10/1988 | Jencek | .................... | F02K 9/976 239/265.19 |
| 5,701,670 A * | 12/1997 | Fisher | ................... | B23P 15/008 29/428 |
| 5,732,883 A | 3/1998 | Beaurain et al. | | |
| 5,832,719 A * | 11/1998 | Riccardi | .................... | F02K 9/64 60/266 |
| 6,134,782 A * | 10/2000 | Wright | .................. | B23P 15/008 29/527.2 |
| 6,325,108 B1 * | 12/2001 | Bettinger | ................. | F16L 9/133 138/153 |
| 7,299,636 B2 * | 11/2007 | Roth | ....................... | F02K 9/976 60/200.1 |
| 2001/0009694 A1 * | 7/2001 | Nakamura | .............. | B29C 70/42 427/249.3 |
| 2002/0178712 A1 * | 12/2002 | Linner | .................... | F02K 9/972 60/257 |
| 2003/0175453 A1 * | 9/2003 | Steffier | .................. | B23P 15/008 428/34.5 |
| 2004/0011023 A1 | 1/2004 | Wherley et al. | | |
| 2004/0093852 A1 | 5/2004 | Fint et al. | | |
| 2009/0235636 A1 * | 9/2009 | Oehrlein | ................... | F02K 7/18 60/200.1 |
| 2010/0031626 A1 * | 2/2010 | Oehrlein | ............... | B29C 70/446 60/200.1 |

* cited by examiner

COMBUSTION CHAMBER PROVIDED WITH A TUBULAR ELEMENT

BACKGROUND OF THE INVENTION

Field of the Invention

The present invention relates to a combustion chamber including a diverging portion.

In the description below, the terms "upstream" and "downstream" are defined relative to the normal flow direction of fluid in the combustion chamber along the walls of said chamber. The terms "inner" and "outer" indicate a region situated at (or facing towards) respectively the inside and the outside of the combustion chamber.

More particularly, the invention relates to a combustion chamber extending along a longitudinal axis and including a fluid injection system from which there extends in a downstream direction a wall presenting a throat and a diverging portion situated downstream from the throat.

Description of the Related Art

Consideration is given in particular to a rocket engine combustion chamber extending in a longitudinal direction defined by its axis of symmetry, the combustion chamber thus being substantially axisymmetric. The axis of symmetry is thus contained with the combustion chamber, unlike combustion chambers that are annular. In such combustion chambers, the propellant components (fuel and oxidizer, e.g. liquid hydrogen and liquid oxygen) are injected into one end 11 of the chamber 10 by injectors of the injection system. FIG. 1 shows such a combustion chamber. The combustion reaction between the propellant components produces combustion gas (e.g. steam) that is expelled via a throat 15 situated opposite from the injectors. Downstream from the throat 15 (the location where the section of the combustion chamber is the smallest), the chamber flares in a diverging portion 20, which serves to increase the speed of the combustion gas expelled through the throat 15, and thus to increase the thrust delivered by the engine. The diverging portion 20 of the chamber 10 is extended downstream by a diverging portion or "bell" 80 of the rocket engine. This engine bell 80 is fastened to the downstream end 25 of the diverging portion 20 of the chamber 10, and it is a portion of the rocket engine that is distinct from the combustion chamber 10.

While the rocket engine is in operation, the walls of the combustion chamber 10, including the wall 30 of the diverging portion 20 of the chamber 10, are raised to very high temperatures (the combustion gas may be at a temperature of about 3500 kelvins (K) upstream from the throat 15 when combustion is between oxygen and hydrogen) and they need to be cooled (their temperature at the throat must not exceed 1000 K) in order to conserve their mechanical properties. The most usual method for performing such cooling consists in causing one of the propellant components to flow in or in contact with the wall 30 of the diverging portion 20 of the chamber 10 since these components are at a very low temperature (e.g. they are liquefied gases). This flow may take place for example in tubes, either embedded in the wall 30 or else covering the wall 30. Alternatively, this flow may take place in open channels that are formed in the wall 30 or else that are fitted to the radially outer face of the wall 30, these channels being closed by a deposit or by a shell.

While the engine is in operation, the high-speed expulsion of the gas generates very large forces on the engine bell 80, which forces are transferred to the wall 30 as longitudinal forces acting on the downstream end of the combustion chamber 10. Furthermore, the aerodynamic forces encountered in flight, e.g. together with the steering forces applied to the engine by actuators acting on the chamber 10, or forces transmitted by other stationary members on the chamber 10, give rise to forces that are both transverse and longitudinal, in particular at the downstream end of the combustion chamber 10, thereby leading to high stresses on the chamber 10, and in particular on the throat 15.

The wall 30 is also subjected to radial forces due to the combustion of the gases inside the chamber 10. In order to avoid the chamber 10 rupturing, it is necessary to reinforce the chamber 10 by increasing the thickness of its walls.

Nevertheless, such an increase in thickness has the effect of preventing thermal expansion of the hot portion of the wall 30 and thus of reducing its lifetime, unless the device for cooling the chamber 10 is modified so as to cool the wall 30 more quickly.

That technique also gives rise to a large increase in the weight of the engine 10, which is harmful, in particular for a rocket engine, which needs to present a weight that is as small as possible.

BRIEF SUMMARY OF THE INVENTION

The present invention seeks to remedy these drawbacks.

The invention seeks to propose a propulsion chamber of small weight while conserving its lifetime and its mechanical strength in operation.

This object is achieved by the fact that the chamber is provided with a tubular element surrounding the wall at least in part and suitable for taking up most of the forces generated during the operation of the chamber on the downstream end of the wall in order to transfer them to a structure situated upstream from the chamber.

By means of these provisions, it is the structure situated upstream from the chamber that directly withstands the longitudinal and transverse forces (external forces applied by the environment and other members supported by the chamber), with the chamber itself withstanding only the radial forces due to the combustion of the gases. Since these radial forces are much smaller than the other forces, in particular those that can lead to the throat of the chamber bending, the walls of the chamber can be dimensioned to have a thickness that is less than that which they would need to have in order to withstand all of the forces. This results in the engine having smaller weight. In addition, the chamber is also less rigid, especially at its throat, thereby giving it a longer service lifetime.

Advantageously, the outer surface of the chamber is surrounded over at least a fraction of its length in the longitudinal direction by a sleeve, the sleeve covering the wall and fitting closely thereto.

Thus, the sleeve is suitable for containing the radial forces that act on the wall 30, thus making it possible to reduce the thickness of the wall, and thus to minimize the total weight of the engine.

BRIEF DESCRIPTION OF THE SEVERAL VIEWS OF THE DRAWINGS

The invention can be well understood and its advantages appear better on reading the following detailed description of an embodiment given by way of non-limiting example. The description refers to the accompanying drawing, in which.

DETAILED DESCRIPTION OF THE INVENTION

Figure 1:
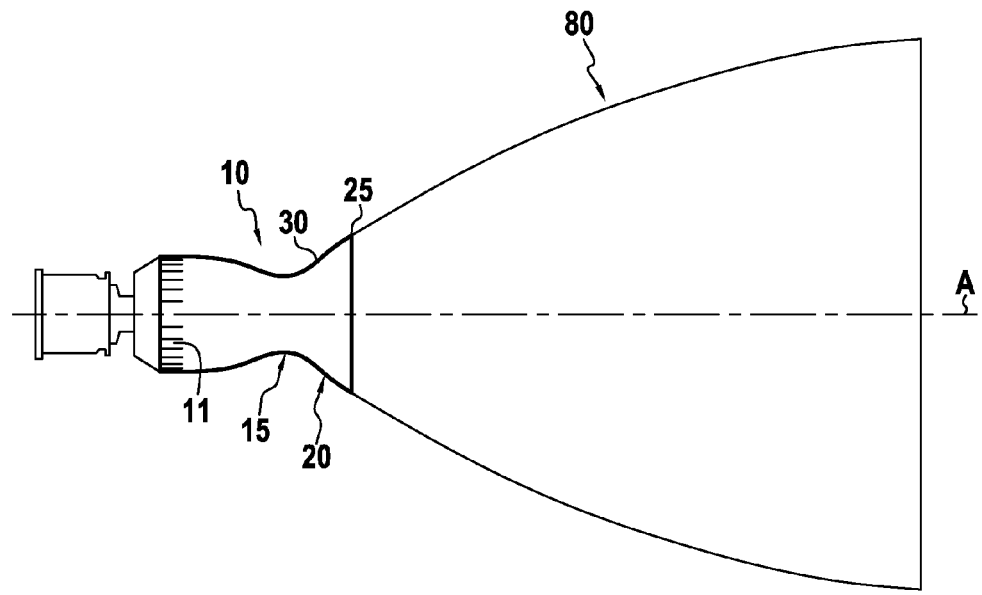
FIG. 1, described above, is an overall longitudinal section view of a rocket engine.
Figure 2:
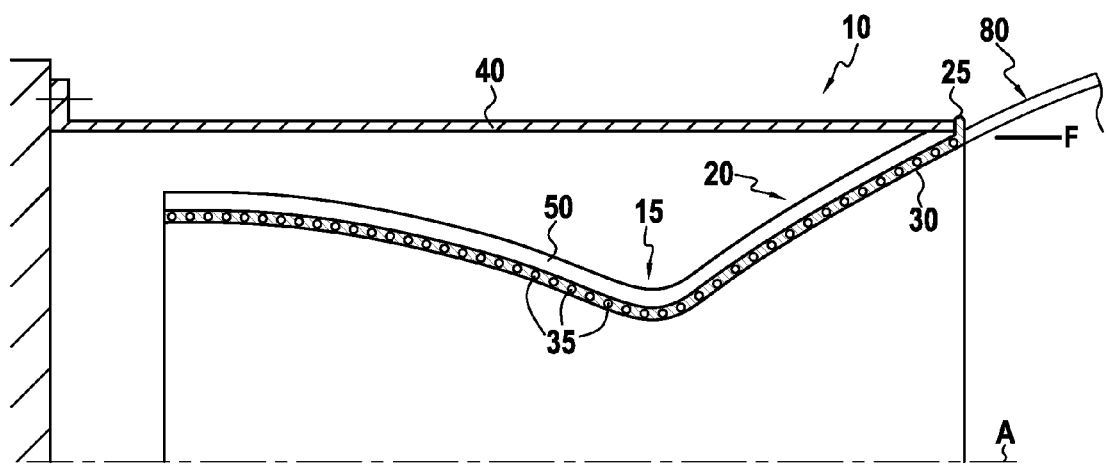
FIG. 2 is a longitudinal section view of a combustion chamber of the invention.

FIG. 2 is a longitudinal section view of the combustion chamber 10 of the invention of the FIG. 1 rocket engine. Given that the combustion chamber 10 is axisymmetric about the longitudinal axis A, only half of the combustion chamber 10 is shown. When the combustion is between hydrogen and oxygen, the steam produced by the combustion of the propellant component injected by the injectors of the injection system is itself ejected via the throat 15 and then the diverging portion 20, and therefore flows from left (upstream) to right (downstream) in FIG. 2, substantially along the axis A.

The outer face of the wall 30 of the diverging portion 20 is cooled by a cooling system 35. For example, this cooling system is a regenerative circuit having a cryogenic liquid flowing therein.

This flow takes place in tubes that are embedded in the wall 30, as shown in FIG. 2, these tubes forming the cooling system 35.

The tubes may also cover the radially outer face of the wall 30.

Alternatively, this flow takes place in open channels that are either hollowed out in the wall 30 or else that are fitted on the radially outer face of the wall 30, these channels then being closed by a deposit, e.g. an electrically-deposited deposit such as nickel or copper or an alloy thereof. These channels may also be closed by a shell, e.g. a shell made of metal or of an organic matrix composite material. Under all circumstances, these channels are covered in this way so as to form a duct that is closed along its length and open at its ends.

The diverging bell 80 is subjected to longitudinal forces directed from downstream to upstream by the high-speed ejection of gas from the bell 80. These forces tend to compress the bell 80 longitudinally. It is also subjected to transverse forces coming firstly from aerodynamic forces acting on a launcher propelled by the rocket engine during the atmospheric stage, and secondly by inertial forces generated when steering the engine in order to control the launcher. Transverse forces may also be generated during transients while starting and stopping the engine, which transients are associated with non-symmetrical separation phenomena of the jet of hot gas.

These forces are transmitted to the diverging portion 20 of the chamber 10 against which the bell 80 bears, and they act on the entire circumference of the downstream end 25 of the diverging portion 20 of the chamber 10. It is this downstream end 25 that constitutes the interface between the diverging portion 20 of the chamber 10 and the bell 80. The longitudinal forces are represented by the force F in FIG. 2 (acting from right to left) along the axis A. The transverse forces are represented by the force T and by the bending moment M in FIG. 2. Since these two types of force (longitudinal and transverse) are generated by sources outside the combustion chamber, they are grouped together under the term "external forces".

A tubular element 40 surrounds the chamber 10 at least in part, and bears both against the downstream end 25 of the diverging portion 20 of the chamber 10 (e.g. against an annular flange situated at said downstream end 25, as shown in FIG. 2), and on a structure located upstream from the chamber 10.

Thus, the external forces are transmitted directly to said structure and therefore do not act on the combustion chamber 10.

This structure may for example be the injection head of the injection system, which injection head includes the injector and is situated at the upstream end 11 of the chamber 10. Under such circumstances, the injection head is subjected to the external forces.

Alternatively, the structure may be situated further upstream than the injection head. Under such circumstances, and advantageously, the injection head does not withstand the external forces and can therefore be made lighter.

The tubular element 40 is a tube surrounding the chamber 10 over its entire length and its entire circumference, and it is at a distance from the wall 30 (except at the downstream end 25), as shown in FIG. 2.

Alternatively, the tubular element 40 is a portion of tube that surrounds the chamber 10 over only a fraction of its circumference, e.g. over half of its circumference or over a plurality of angular sectors. Alternatively, the tubular element 40 may be made up of a plurality of longitudinal bars constituting spacers that are distributed around the chamber 10, these bars optionally being connected together at their upstream ends by a ring, and/or connected together at their downstream ends by a ring.

In FIG. 2, the tubular element 40 is cylindrical in shape, i.e. its radius relative to the longitudinal axis A is constant along the longitudinal direction.

Relative to the longitudinal axis A, the tubular element 40 could have a radius that is not constant, i.e. it could be generally conical or frustoconical in shape.

Thus, the chamber 10 is subjected essentially to the radial forces (directed in a plane perpendicular to the longitudinal axis A) that are due to the combustion of the gases. Given that these radial forces may be much smaller than the external forces, it is necessary to dimension the reinforcement of the chamber 10 only so that it can withstand these radial forces, and not so that it can withstand the radial forces and the external forces.

This reinforcement is performed by surrounding the combustion chamber 10 over at least a fraction of its length in the longitudinal direction by means of a sleeve 50.

The sleeve 50 fits closely to the wall 30 of the chamber 10 so as to be suitable for containing the radial forces acting on the wall 30, and it presents a thickness that is as small as possible in order to minimize the weight of the chamber 10.

Advantageously, the sleeve 50 is made of a material having specific stiffness (ratio of its stiffness E divided by its density $\rho$) and a specific elastic limit (ratio of its elastic limit, i.e. its maximum stress $\sigma_Y$ in the elastic range, divided by density $\rho$) that are greater respectively than the specific stiffness and the specific elastic limit of the material constituting the walls 30 of the chamber 10, and where appropriate, of the material constituting the cooling system 35 (tubes or channels). Thus, a weight saving is achieved for the chamber 10 fitted with the sleeve 50, the assembly nevertheless being suitable for withstanding the radial forces and, where appropriate, a small fraction of the external forces that are not taken up by the tubular element 40.

Advantageously, the sleeve 50 surrounds the chamber 10 over its entire length.

This makes the chamber 10 stronger.

The tubes (or channels) of the cooling system 35 are also subjected to an internal pressure by the flow of cooling fluid they convey. They must therefore posses some minimum amount of thickness in order to withstand this internal pressure.

Advantageously, the sleeve 50 covers and fits closely over the cooling system 35. Thus, when the cooling system is constituted by tubes embedded in the wall 30, the sleeve 50 fits closely over the radially outer face of the wall 30, as shown in FIG. 2. When the cooling system 35 is constituted by tubes or closed channels situated on the radially outer face of the wall 30, the sleeve 50 fits closely over the radially outer faces of these tubes or channels.

The term fits "closely" is used to mean that there is intimate contact between the elements over the major part of their surface areas.

Thus, under all circumstances, the sleeve 50 provides radial support to the cooling system 35. When the cooling system 35 is made up of channels, the minimum thickness of the channels can thus be smaller without them breaking. This results in a reduction of the weight of the channels, and thus in the overall weight of the engine.

For example, the sleeve 50 is made of a composite material constituted by fibers embedded at least in part in a matrix. Advantageously, the sleeve 50 is made of a composite material having an organic (polymer) matrix. For example, the fibers may be continuous fibers wound around the wall 30 so that the fibers are stressed essentially in tension under the influence of the internal pressure inside the chamber 10. This fabrication technique imparts great strength to the chamber 10 with its sleeve 50, since the fibers commonly used in polymer matrix composites present great stiffness and tension strength. For example, the fibers are carbon fibers or glass fibers or Kevlar fibers. In addition, the low density (less than 2 grams per cubic centimeter ($g/cm^2$)) of organic matrix composites having such fibers enables the weight of the combustion chamber 10 to be reduced. In addition, the very small expansion coefficient of this type of material when cold contributes, particularly when cryogenic cooling is used, to minimizing the stress on the walls 30, compared with using a metal material that contracts at low temperature and adds this compression to the expansion of the walls 30.

The fibers could equally well be metal fibers.

The chamber 10 is wound in known manner by winding continuous fibers around the chamber 10 e.g. in a circumferential direction, and then densifying the preform with the matrix so as to form the rigid sleeve 50.

Alternatively, fibers may be woven or braided around the chamber 10 so as to obtain a fiber preform, which preform is then densified. The method for weaving or braiding around the shape of a body of revolution is itself known.

It is possible to place an insert at the throat 15 in order to fill in the hollow due to the narrowing of the chamber 10 at the throat 15, so as to make it easier to fabricate the sleeve 50 by one of the above methods.

The sleeve 50 may be extended longitudinally upstream so that it also surrounds at least a portion of the injection system of the engine that is situated upstream from the combustion chamber 10.

For example, the sleeve 50 surrounds the injection head of the injection system in part or in full, or indeed the entire injection system.

This solution also imparts greater strength to the engine, and is particularly suitable for smaller engines.

During transient operating stages on starting or stopping the engine, the flow of cryogenic fluid in the cooling system 35 leads to the chamber 10 contracting in a radial direction and thus to its diameter being reduced, at least in certain portions.

If this reduction is so great as to be capable of leading to delamination at the interface between the wall 30 and the sleeve 50 during transient operation of the engine, the sleeve 50 should be prestressed while it is being put into place on the combustion chamber 10, i.e. so that it exerts a compressive stress on the chamber 10 once it has been put into place on the chamber 10. Thus, when the chamber reduces slightly in diameter, the sleeve 50 remains in contact with the wall 30 and continues to support the wall 30 and the cooling system 35 in a radial direction.

The invention claimed is:

1. A combustion chamber extending along a longitudinal axis and comprising:
   a fluid injection system from which there extends in a downstream direction a wall presenting a throat and a diverging portion situated downstream from the throat, the diverging portion comprising an annular flange, continuously formed with the wall, on a downstream end of the diverging portion, the combustion chamber including a cooling system embedded inside the wall; and
   a tubular element, being concentric with the combustion chamber, and having a constant radius over an entire length of the tubular element relative to the longitudinal axis along a longitudinal direction surrounding the wall at least in part,
   wherein the tubular element bears both against the annular flange of the downstream end of the diverging portion and on a structure located upstream from the combustion chamber, the tubular element being configured to take up most forces generated on the wall during operation of the combustion chamber on the downstream end of the diverging portion to transfer the forces to the structure located upstream from the combustion chamber, the tubular element also being configured to allow thermal expansion of the cooling system, the tubular element being independent from the cooling system in that no part of said tubular element is in contact with a liquid flowing inside said cooling system.

2. The combustion chamber according to claim 1, wherein an outer surface of the combustion chamber is surrounded over at least a fraction of a length of the outer surface of the combustion chamber in the longitudinal direction by a sleeve, the sleeve covering the wall and fitting closely to the wall.

3. The combustion chamber according to claim 2, wherein the sleeve is made of an organic matrix composite material.

4. The combustion chamber according to claim 2, wherein the sleeve covers the cooling system and fits closely to the cooling system.

5. The combustion chamber according to claim 4, wherein the cooling system is a regenerative circuit and the liquid flowing inside said cooling system is a cryogenic liquid.

6. The combustion chamber according to claim 2, wherein the sleeve surrounds the combustion chamber over an entire length of the wall.

7. The combustion chamber according to claim 2, wherein the sleeve is prestressed while being put into place on the combustion chamber.

8. The combustion chamber according to claim 2, wherein the sleeve also surrounds at least a portion of the fluid injection system from which the wall extends, the fluid injection system being situated upstream from the combustion chamber.

9. A rocket engine comprising the combustion chamber according to claim 1 and a diverging bell situated downstream from the combustion chamber.

10. The combustion chamber according to claim 1, wherein the tubular element is a tube surrounding the wall over an entire length and the entire circumference of the wall.

11. The combustion chamber according to claim 1, wherein the structure located upstream from the combustion chamber is an injection head of the fluid injection system.

12. The rocket engine according to claim 9, wherein the annular flange constitutes an interface between the diverging portion of the wall and the diverging bell.

* * * * *